United States Patent

Viano et al.

[11] Patent Number: 6,073,960
[45] Date of Patent: Jun. 13, 2000

[54] AIR BAG ASSEMBLY

[75] Inventors: David Charles Viano, Bloomfield Hills; Minoo Jaswantlal Shah, Farmington Hills, both of Mich.; Philip Wendel Hopf, Bellbrook, Ohio; Axel Kaiser, Maintal, Germany

[73] Assignee: General Motors Corporation, Detroit, Mich.

[21] Appl. No.: 09/065,912

[22] Filed: Apr. 24, 1998

[51] Int. Cl.$^7$ .................................................. B60C 21/22
[52] U.S. Cl. ........................................................ 280/730.1
[58] Field of Search ............................. 280/730.1, 730.2

[56] References Cited

U.S. PATENT DOCUMENTS

| | | |
|---|---|---|
| 2,834,606 | 5/1958 | Bertrand . |
| 2,834,609 | 5/1958 | Bertrand . |
| 3,865,433 | 2/1975 | Stafford . |
| 5,044,663 | 9/1991 | Seizert ..................................... 280/730 |
| 5,362,097 | 11/1994 | Barske ................................ 280/730 R |
| 5,575,497 | 11/1996 | Suyama et al. ....................... 280/730.1 |
| 5,865,462 | 2/1999 | Robins et al. ........................ 280/730.2 |
| 5,924,723 | 7/1999 | Brantman et al. .................... 280/730.2 |

FOREIGN PATENT DOCUMENTS 110252  4/1992  Japan .

Primary Examiner—Brian L. Johnson
Assistant Examiner—Tony Winner
Attorney, Agent, or Firm—Kathryn A. Marra

[57] ABSTRACT

A vehicle has an upper front interior corner and at least one seating position for a vehicle occupant. An air bag assembly includes an inflator for generating gas; and an air bag deployable upon generation of gas by the inflator. The air bag is stored in the upper front interior corner of the vehicle, and the air bag is a single integral air bag having a frontal portion and a side portion. The frontal portion and the side portion are in fluid communication with each other. Upon air bag deployment, the frontal portion deploys downwardly and in front of the vehicle occupant and the side portion deploys downwardly and to the side of the vehicle occupant such that the air bag wraps around the occupant during deployment. Preferably, the frontal portion and the side portion are generally 90 degrees relative to each other. Also preferably, the vehicle has air bag assemblies in opposite front upper interior corners that are mirror images of each other for commonization of parts.

20 Claims, 2 Drawing Sheets

AIR BAG ASSEMBLY

This invention relates to a vehicle air bag assembly, and more particularly to an air bag assembly having a combined front and side cushion.

BACKGROUND OF THE INVENTION

It is well known in motor vehicles to provide an air bag assembly for protecting a vehicle occupant. It is also known to provide an air bag assembly including an air bag and an inflator for generating gas to inflate the air bag upon sensing predetermined vehicle conditions. It is also known to provide an air bag assembly for both front and side impact protection of the vehicle occupant.

The prior art has disclosed side impact air bag assemblies which have either one air bag or a plurality of air bags which deploy to protect the head and/or torso portions of the vehicle occupant. Certain proposed other prior art side air bags are stored in a folded condition along the roof rail and extending between the A-pillar and B-pillar for deployment downward for protection generally of the head and upper body of a vehicle occupant during a side impact. In addition, other side air bags have been proposed for protection of the torso only that generally deploy from the seat or door.

It is also well known to provide air bags for forward protection of an occupant. An air bag is typically provided in the vehicle steering wheel for protection of the driver and another air bag is provided in the vehicle instrument panel for protection of the vehicle passenger. The air bag assemblies have much different designs for the driver's side and the passenger's side such that two assemblies are separately designed for the vehicle. In addition, the vehicle may also include an upper side air bag for use on opposite sides of the vehicle. Thus, a vehicle having both upper side and frontal air bag assemblies will include essentially four separate air bag assemblies having three completely different designs. The number of different air bag assemblies in the vehicle is increased even further if there is also a side lower torso air bag.

Traditionally, the prior art has taught that it is desirable to have separate front and side air bag assemblies that can deploy at different times based on the direction of the vehicle deceleration. Typically, it is also desirable to have separate front and side air bags so that the side air bag uses a sensor and inflator arrangement that signals deployment earlier in a side deceleration event than the frontal air bag in a longitudinal deceleration event. Thus, typical vehicle air bag systems have numerous separate sensors, inflators, and cushions that must be designed and packaged in very different vehicle packaging locations.

SUMMARY OF THE INVENTION

This invention offers alternatives and advantages over the prior art by providing an air bag assembly that has a combined frontal and upper side air bag assembly that deploys as a single unit for continuous front to side coverage. The invention provides features that enable the timely positioning of the frontal and side portions of the air bags at the appropriate times for both side and front protection and combinations thereof. The air bag assembly may be particularly useful in certain vehicles designs in which the desired timing of the frontal deployment is approaching that of the side deployment. The air bag assembly may also be useful, especially in compact vehicles, by allowing greater interior styling flexibility and increased interior space.

These advantages are accomplished in a preferred form of the present invention by providing an air bag assembly in a vehicle having an upper front interior corner and at least one seating position for a vehicle occupant. The air bag assembly includes an inflator for generating gas; and an air bag deployable upon generation of gas by the inflator. The air bag is stored in the upper front interior corner of the vehicle, and the air bag has a frontal portion and a side portion. Preferably, the air bag is a single integral air bag. The frontal portion and the side portion are in fluid communication with each other. Upon air bag deployment, the frontal portion deploys downwardly and in front of the vehicle occupant and the side portion deploys downwardly and to the side of the vehicle occupant such that the air bag wraps around the occupant during deployment. Preferably, the frontal portion and the side portion are generally at 90 degrees relative to each other.

In accordance with other preferred aspects, the air bag includes a tether positioned between the side portion and the frontal portion for directing inflation gas. Also preferably, the side portion of the air bag deploys quicker than the frontal portion of the air bag, and the frontal portion has a volume greater than the side portion. During activation, the peak inflation of the side portion preferably occurs at about 30 ms after sensing and the peak inflation of the frontal portion preferably occurs at about 50 ms after sensing. The vehicle includes an A-pillar and the frontal portion intersects the side portion to define a central A-pillar portion that deploys downwardly between the occupant and the A-pillar of the vehicle for continuous front to side coverage.

According to other preferred aspects, the vehicle has opposing upper front interior corners and positions for seating vehicle occupants on opposing side of the vehicle proximate the upper front interior corners. An air bag system includes a first air bag assembly located in one of the upper front interior corners and a second air bag assembly located in the other of the upper front interior corners which are mirror images of each other. Each of the air bag assemblies includes an inflator for generating gas, and an air bag deployable upon generation of gas by the inflator, the air bag being a single integral air bag having a frontal portion and a side portion, the frontal portion and the side portion being in fluid communication with each other, the frontal portion being sized and shaped for deploying downwardly and in front of the respective vehicle occupant, and the side portion being sized and shaped for deploying downwardly and to the side of the respective vehicle occupant.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
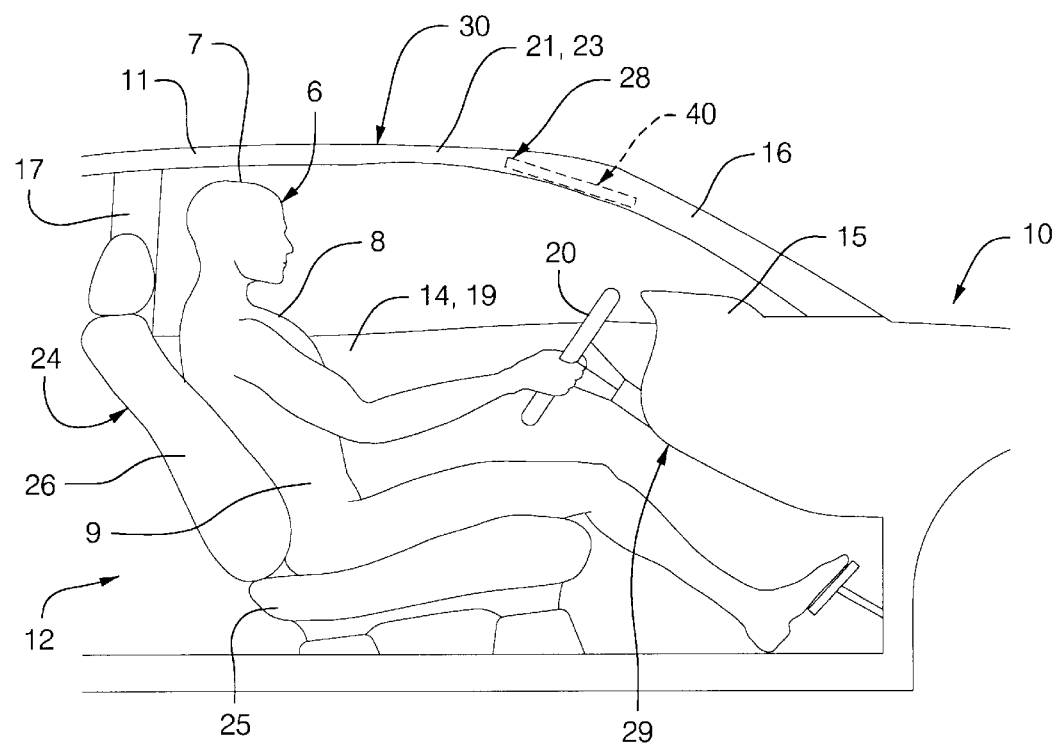
FIG. 1 is side view of a vehicle interior partially-broken-away and including an air bag assembly in an undeployed condition.
Figure 2:
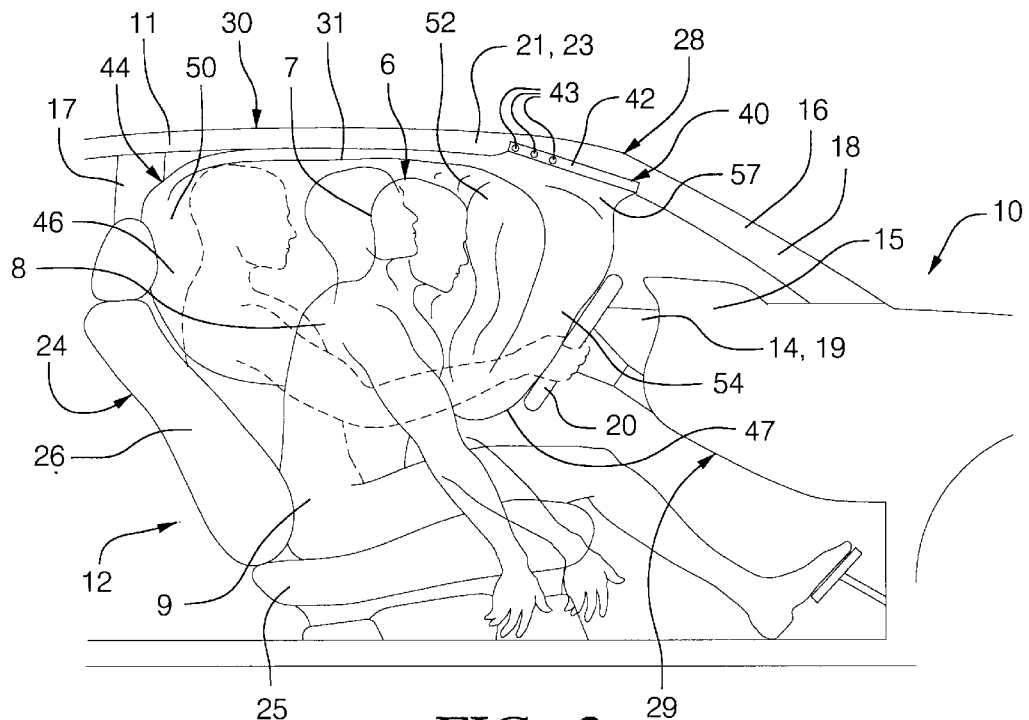
FIG. 2 is a view similar to FIG. 1, but showing the air bag assembly in the deployed condition revealing an inflated cushion.
Figure 3:
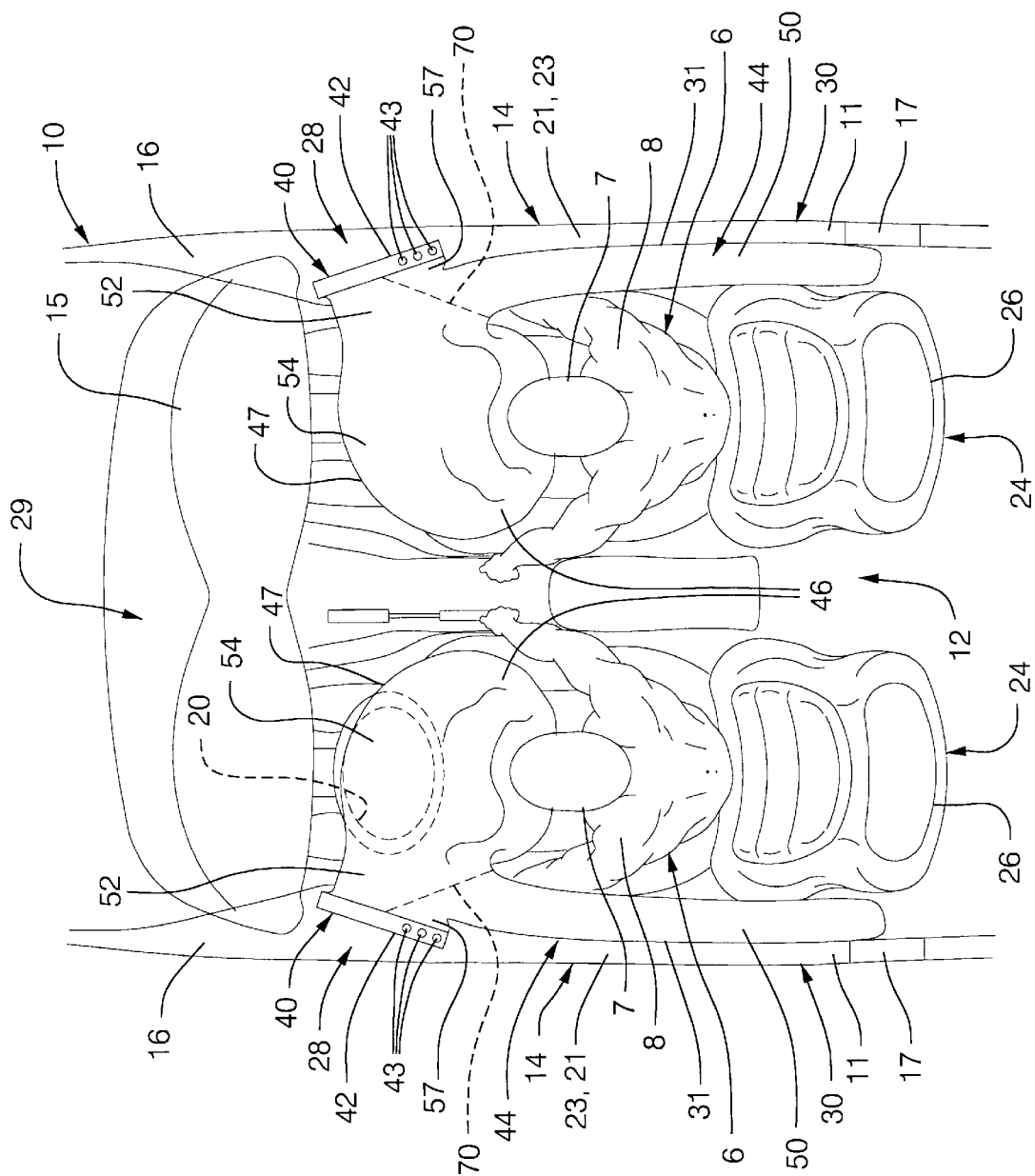
FIG. 3 is a top view of the vehicle showing first and second air bag assemblies in the deployed condition and showing both the driver and passenger side of the vehicle.

Referring to FIGS. 1–3, it is seen that a vehicle 10 includes a vehicle interior 12 having front doors 14 positioned between front side door pillars 16 (commonly referred to as A-pillars) and rear side door pillars 17 (commonly referred to as B-pillars). Movable windows 18 are mounted on the doors 14. The doors 14 also include inner door trim panels 19 which typically mount door handles and armrests (not shown). The vehicle 10 further includes the side roof rails 11 extending generally between the A-pillars 16 and the B-pillars 17. Generally located at the intersections of the roof rails 11 and the A-pillars 16, the vehicle 10 includes opposite front upper interior corners 28. It will be appreciated that the term upper interior corners 28 applies to any location in the area around the intersection of the A-pillars 16 and the roof rails 11 and does not need to be directly in the intersection, but only in the general vicinity and could also be included at a preferred location of about 5–10 cm away from the intersection and into the roof header. Each of the side structures 30 of the vehicle 10 generally includes the door 14, window 18, and roof rail 11. The vehicle 10 also includes an instrument panel 15 spaced in front of the occupants 6. A steering wheel 20 is positioned in front of the occupant 6 on the driver's side of the vehicle 10. The front structure 29 of the vehicle 10 generally includes the steering wheel 20, the instrument panel 15 and windshield (not shown) extending laterally between the A-pillars 16.

The vehicle interior 12 further include seats 24 each having a lower seat bottom 25 and an upper seat back 26. Vehicle occupants 6 may be seated in one or more of the vehicle seats 24. The occupants 6 each include a head portion 7, an upper torso portion 8, and a lower torso portion 9.

Referring to FIGS. 1–3, air bag assemblies 40 according to the present invention are shown preferably mounted to the vehicle 10 generally at the front upper interior corners 28 formed at the intersections of the A-pillars 16 to the roof rails 11. The air bag assemblies 40 each include the basic component parts of an inflator 42 and an air bag 44. The inflators 42 may preferably be directly attached to the air bags 44, such as by wrapping the air bag 44 around the inflator 42. Prior to deployment, the air bags 44 are preferably folded and stored in some type of housing 23 which may simply be provided as part of a plastic interior trim 21 covering the A-pillar 16 and roof rail 11 areas. However, it will be appreciated that the housing 23 could alternately be provided by a separate covering, preferably of cloth or plastic, that is either mounted atop or beneath the interior trim 21. It will further be appreciated that the air bag assemblies 40 could also be stored completely or partially beneath a headliner (not shown) located in the roof of the vehicle 10 or anywhere generally within the front upper interior corners 28.

The inflators 42 may be of any conventional construction which contain chemicals for igniting to generate gas for discharge upon the sensing of certain predetermined vehicle 10 conditions. The inflators 42 preferably include ports 43 through which the inflator gas is discharged to inflate the air bags 44. As best shown in FIG. 3, the ports 43 are preferably located on the rearward end of the inflators 42 for initial discharge in a side portion 50 of the air bag 44, as will be described further hereinafter. However, other positions of the ports 43 are possible, depending on the air bag fold, venting, and tether 70 configurations.

As best shown in FIGS. 2 and 3, the air bags 44 are preferably made of a fabric material which is suitable for air bag 44 construction. The air bags 44 each include an inboard contact face 46 located adjacent the vehicle occupants 6 during air bag deployment, and an opposite outboard contact face 47. The air bags 44 each include a side portion 50 adapted for alignment with the upper side of the vehicle occupants 6, generally at a location between the doors 14 and windows 18 of the vehicle 10 and the sides of the head portions 7 and upper torso portions 8 of the occupants 6. The air bags 44 further each include a frontal portion 54 adapted for alignment in front of the vehicle occupants 6. The front and side portions 54, 50 of the respective air bags 44 are preferably integrally formed from the same sheet or sheets of fabric material and are in fluid communication with each other. The frontal portions 54 of each air bag 44 extend generally at 90 degrees relative to the side portions 50. A central portion 52 is formed at each intersection of the front and side portions 54, 50 and generally covers the A-pillars 16 of the vehicle 10, as described further hereinafter. The air bags 44 preferably each include a mouth portion 57 in fluid communication with the inflator 42 for receiving discharging inflator gas therethrough.

It will be appreciated that advantageously, the air bag assemblies 40 located on the driver and passenger sides of the vehicle 10 are preferably mirror images of each other and can use the same or very similar components and design. This is advantageous over the prior art in which the driver's air bag assembly in the steering wheel 20 is completely different from the passenger side air bag assembly stored in the instrument panel 15. Thus, common parts and testing can be used for both the driver and passenger side air bag assemblies 40. Also advantageously, common body designs can be used for the front upper interior corners 28 at the A-pillar 16 and roof rail 11 areas on opposite sides of the vehicle 10 to eliminate the need for different manufacturing operations of these large body components. However, it will be appreciated that there may be some variations, especially in the shape of the air bag 44 for variations in vehicle geometry from driver to passenger side. Also advantageously, separate side head-curtain type air bag assemblies can be eliminated. Another advantage is that since the air bag assemblies 40 are stored in the A-pillar 16 and roof rail 16 areas or somewhere in the front upper interior corners 28, extensive styling freedom is enabled for the steering wheel 20 and the instrument panel 15 designs. In addition, the vehicle interior 12 may be able to provide more occupant space, especially on the passenger side of the vehicle 10. Furthermore, it will be appreciated that a single air bag assembly 40 can be used for both upper side and frontal protection of the occupants 6, thus cutting in half the overall number of inflators, sensors, housings, packaging requirements and cushions over the typical prior art arrangements.

The frontal portions 54 of the air bags 44 each have a volume which is preferably, but not necessarily, greater than the side portions 50 of the respective air bags 44. The frontal portions 54 of the air bags 44 are preferably sized and shaped to deploy between the occupants 6 and the vehicle frontal structure 29, such as the steering wheel 20 and the instrument panel 15. The frontal portions 54 eliminate the need for any other frontal air bags located in the steering wheel 20 or instrument panel 15. The side portions 50 are preferably sized and shaped to deploy between the occupants 6 and the side structure 30, such as the doors 14 and windows 18. The side portions 50 generally act as a head curtain to cover a large vertical and longitudinal area and are generally longer and taller than the frontal portions 54, but preferably not as deep in the lateral direction. The use of the side portions 50 eliminates the need for a separate head-curtain type air bag assembly as in the prior art.

Preferably as shown in FIG. 3, an internal tether 70 may be provided between the side portions 50 and the frontal portions 54 of each of the air bags 44. The tether 70 can be positioned in different locations within the air bag 44, but preferably generally extends between the side and frontal portions 50, 54. The tether 70 may be a single tether 70 or many be made up of multiple pieces of flexible, foldable fabric material. The tether 70 is designed to permit the side and frontal portions 50, 54 of the air bag 44 to be in fluid communication with each other, such as by including openings, vents, or by material porosity. Also advantageously, the tether 70 can be used to control and direct the flow of inflator gases during deployment so that the relative timing of the full inflation of the side and frontal portions 50, 54 can be controlled. Preferably, the tethers 70 are designed and positioned such that the side portions 50 of the air bags 44 inflated more quickly than the frontal portions 54 of the air bags 44.

The quicker inflation of the side portions 50 may also be accomplished by some combination of the side portions 50 having a lesser internal volume and by the inflator ports 43 discharging gas more directly into the side portions 50 than the frontal portions 50. The direction of gas into the bag may also be controlled by the addition of pyrotechnic venting, such as that sold by the assignee of this application under the trademark name of "INNOVENT", and any variations or improvements thereof. In addition, the folding of the air bag 44 can also affect the inflation characteristics of the air bag 44. For example, the side portions 50 of the air bags 44 can be folded loosely or even unfurled along the roof rails 11, while the frontal portions 54 of the air bags 44 are folded tightly, for example such as by rolling, so that the side portions 50 inflate more quickly than the frontal portions 54. In the case when the side portions 50 of the air bags 44 are initially unfurled, the upper edges of the side portions 50 could also be connected to the roof rails 11 for stability of the side portions 50 of the air bags 44.

It will be appreciated that the frontal portions 54 and the side portions 50 intersect at central portions 52 on each of the air bags 44. The central or A-pillar portions 52 are generally aligned between the A-pillars 16 and the occupants 6 during deployment. Accordingly, this air bags 44 can be useful for lateral and longitudinal deceleration and certain combinations thereof. Advantageously, the single combination frontal and side air bags 44 provide continuous and uninterrupted coverage of the front and side structures 29, 30 and wrap around the occupants 6, as described further hereinafter.

Upon the vehicle 10 experiencing certain predetermined conditions, a vehicle sensor (not shown) detects conditions for air bag deployment. Various types of sensors may be used, such as omni-directional or tri-axial sensors which refer to algorithms that decide where and when to direct the inflation gas which may also be in connection with the "INNOVENT" technology. Also, the total number of sensors for side and front deployment may also be reduced using this type of air bag assembly 40. Preferably, the sensing takes about 6 milliseconds (ms), similar to typical side sensors. On each side of the vehicle 10, the inflator 42 generates inflator gas which is discharged into the mouth portions 57 of the air bags 44 to inflate the air bags 44. The force of the deploying air bags 44 break out through any housing or trim 21 surrounding the air bags 44. The side and frontal portions 50, 54 of the air bags 44 deploy in downward directions as they inflate. Upon inflation, the side portions 50 are positioned adjacent the head portions 7 and upper torso portions 8 of the occupants 6 and the side structures 30 of the vehicle 10. The frontal portions 54 are positioned in front of the occupants 6 between the front structure 29 and the occupants 6. The central A-pillar portions 52 of the air bags 44 are positioned between the occupants 6 and the A-pillars 16 and provide a continuous connection between the front and side portions 54, 50. Thus, the air bags 44 generally wrap around the occupants 6.

Preferably, the side portions 50 are initially filled with inflator gas prior to the frontal portions 54 of the air bags 44 and are fully inflated within about 30 ms from sensing. Then the frontal portions 54 become fully inflated within about 50–60 ms from sensing.

It will be appreciated that the combination air bags 44 used for both frontal and upper side protection must deploy rapidly and at a relatively high pressures to be effective. Appropriate venting may be provided to vary the stiffness of the air bags 44 and may also be combined with specific areas of trapped gas, such as in a smaller internal compartment or bladder of the air bag 44, to potentially provide extended protection for certain vehicle events. While being suitable for a variety of vehicle types, it will further be appreciated that the combination front and side air bags 44 of this invention may best be suited for vehicles having a short and quick frontal crash pulse so that the timing necessary for positioning the frontal portions 54 of the air bags 44 approaches the timing desired for deploying the side portions 50 of the air bags 44 since the respective side and frontal portions 50, 54 are preferably inflated by the same inflators 42. Thus, the particular vehicle geometry and stiffness characteristics need to be carefully considered for potential use of these combination air bags 44.

It will be understood that a person skilled in the art may make modifications to the preferred embodiment shown herein within the scope and intent of the claims. Although the preferred embodiment shows the combination air bag 44 being used with a single inflator 42, it will be understood that more than one inflator or a dual stage inflator may also be used. It will further be appreciated that the air bag assemblies 40 could also be mounted in the B-pillar 17 to roof rail 11 area of the vehicle 10 for protection of rear seat occupants. Thus, the same or very similar air bag assemblies 40 could be used in numerous locations throughout the vehicle 10 for commonization of parts. Although the side portions 54 are shown mainly as a head curtain, they could be made longer to also provide lower torso protection. It will also be appreciated that the air bags 44 could be designed to hold pressure for longer amounts of time for extended protection. It will also be appreciated that the air bags 44 could be provided with various vent holes or chambers and internal tethering to control the deployment under differing directions of vehicle accident conditions. For example, certain tethering and chambering could restrict frontal or side deployment under certain conditions or direct the air bag towards deployment to the front prior to the side inflation.

While the present invention has been described as carried out in a specific embodiment thereof, it is not intended to be limited thereby but is intended to cover the invention broadly within the scope and spirit of the claims.

What is claimed is:

1. An air bag system in a vehicle having opposing upper front interior corners, the vehicle having positions for seating vehicle occupants on opposing side of the vehicle proximate the upper front interior corners, the air bag system comprising:

a first air bag assembly located in one of the upper front interior corners and a second air bag assembly located in the other of the upper front interior corners, each of the air bag assemblies comprising;

an inflator for generating gas, and an air bag deployable upon generation of gas by the inflator, the air bag being a single integral air bag that includes a tether extending between a side portion and a frontal portion, the frontal portion and the side portion being in fluid communication with each other, the frontal portion being sized and shaped for deploying downwardly and in front of the respective vehicle occupant and the side portion being sized and shaped for deploying downwardly and to the side of the respective vehicle occupant;

whereby the first and second air bag assemblies are mirror images of each other.

2. The air bag system of claim 1 wherein the frontal portions and the side portions of each of the air bag assemblies are generally 90 degrees relative to each other.

3. The air bag system of claim 1 wherein the air bag assemblies each include a tether positioned between the respective side portions and the frontal portions for directing inflation gas.

4. The air bag system of claim 1 wherein the side portions of the air bag assemblies deploy quicker than the frontal portions of the air bag assemblies.

5. The air bag system of claim 1 wherein the frontal portions have greater volumes than the respective side portions.

6. The air bag system of claim 1 wherein the peak inflation of the side portions occur at about 30 ms after sensing and wherein the peak inflation of the frontal portions occur at about 50 ms after sensing.

7. The air bag system of claim 1 wherein the vehicle includes opposing A-pillars and wherein the respective frontal portions intersect the respective side portions to define central A-pillar portions that deploy downwardly between the occupants and the A-pillars of the vehicle.

8. An air bag assembly in a vehicle having an upper front interior corner, the vehicle having at least one seating position for a vehicle occupant, the air bag assembly comprising:

an inflator for generating gas; and an air bag deployable upon generation of gas by the inflator and being stored in the upper front interior corner of the vehicle, the air bag being a single integral air bag that includes a tether extending between a side portion and a frontal portion, whereby upon air bag deployment, the frontal portion deploys downwardly and in front of the vehicle occupant and wherein the side portion deploys downwardly and to the side of the vehicle occupant such that the air bag wraps around the occupant during deployment for continuous front to side coverage.

9. An air bag assembly as set forth in claim 8 wherein the frontal portion and the side portion are in fluid communication with each other.

10. An air bag assembly as set forth in claim 8 wherein the air bag is stored solely in the upper front interior corner of the vehicle.

11. An air bag assembly as set forth in claim 8 including a housing covering the air bag.

12. An air bag assembly as set forth in claim 8 wherein the frontal portion extends generally at ninety degrees relative to the side portion.

13. An air bag assembly as set forth in claim 8 wherein the side portion is longer and taller than the frontal portion.

14. In a vehicle having at least one A-pillar, a B-pillar, a side roof rail extending between the A-pillar and B-pillar, an upper front interior corner at the intersection of the roof rail and the A-pillar and at least one seating position for a vehicle occupant, an air bag assembly comprising:

an inflator for generating gas; and an air bag deployable upon generation of gas by the inflator; the air bag being stored in the upper front interior corner of the vehicle, the air bag being a single integral air bag that includes a tether extending between a side portion and a frontal portion, whereby upon air bag deployment, the frontal portion deploys downwardly and in front of the vehicle occupant and wherein the side portion deploys downwardly and to the side of the vehicle occupant such that the air bag wraps around the occupant during deployment for continuous front to side coverage.

15. An air bag assembly as set forth in claim 14 wherein the frontal portion and the side portion are in fluid communication with each other.

16. An air bag assembly as set forth in claim 14 wherein the air bag is stored solely in the upper front interior corner of the vehicle.

17. An air bag assembly as set forth in claim 14 including a housing covering the air bag.

18. An air bag assembly as set forth in claim 14 wherein the frontal portion extends generally at ninety degrees relative to the side portion.

19. An air bag assembly as set forth in claim 14 wherein the side portion is longer and taller than the frontal portion.

20. An air bag system in a vehicle having opposing upper front interior corners, the vehicle having positions for seating vehicle occupants on opposing side of the vehicle proximate the upper front interior corners, the air bag system comprising:

a first air bag assembly located solely in one of the upper front interior corners and a second air bag assembly located solely in the other of the upper front interior corners, each of the air bag assemblies comprising;

an inflator for generating gas, and an air bag deployable upon generation of gas by the inflator, the air bag being a single integral air bag that includes a tether extending between a side portion and a frontal portion, the frontal portion and the side portion being in fluid communication with each other, the frontal portion being sized and shaped for deploying downwardly and in front of the respective vehicle occupant and the side portion being sized and shaped for deploying downwardly and to the side of the respective vehicle occupant;

whereby the first and second air bag assemblies are mirror images of each other.

* * * * *